(12) United States Patent
McWherter

(10) Patent No.: US 10,324,952 B1
(45) Date of Patent: Jun. 18, 2019

(54) HOSTED DATABASE

(71) Applicant: Google LLC, Mountain View, CA (US)

(72) Inventor: David T. McWherter, Seattle, WA (US)

(73) Assignee: Google LLC, Mountain View, CA (US)

( * ) Notice: Subject to any disclaimer, the term of this patent is extended or adjusted under 35 U.S.C. 154(b) by 978 days.

(21) Appl. No.: 13/783,801

(22) Filed: Mar. 4, 2013

(51) Int. Cl.
*G06F 16/27* (2019.01)
*G06F 16/84* (2019.01)

(52) U.S. Cl.
CPC .............. *G06F 16/27* (2019.01); *G06F 16/86* (2019.01)

(58) Field of Classification Search
None
See application file for complete search history.

(56) References Cited

U.S. PATENT DOCUMENTS

| | | | | |
|---|---|---|---|---|
| 5,765,039 A * | 6/1998 | Johnson | ............ | G06F 17/30607 719/328 |
| 5,781,910 A * | 7/1998 | Gostanian | ......... | G06F 17/30348 707/610 |
| 6,286,052 B1 * | 9/2001 | McCloghrie et al. | ........ | 709/238 |
| 6,363,391 B1 * | 3/2002 | Rosensteel, Jr. | ............................ G06F 17/30592 |
| 6,732,360 B1 * | 5/2004 | Seo | ........................ | H04L 41/022 719/310 |
| 6,757,745 B1 * | 6/2004 | Hamann | ............... | H04Q 3/0062 370/469 |
| 6,950,848 B1 * | 9/2005 | Yousefi'zadeh | .......... | G06F 9/50 707/999.01 |
| 8,171,460 B2 * | 5/2012 | Pizzoli | .................. | G06F 9/4443 704/2 |
| 8,458,166 B2 * | 6/2013 | Bent et al. | ..................... | 707/713 |
| 8,522,137 B1 * | 8/2013 | Brown et al. | ................. | 715/239 |
| 2002/0174266 A1 * | 11/2002 | Palem | ................. | G06F 9/30003 719/328 |
| 2003/0131147 A1 * | 7/2003 | Wilt | ........................ | G06F 8/447 719/321 |
| 2004/0030739 A1 * | 2/2004 | Yousefi'zadeh | ............................ G06F 17/30545 709/201 |
| 2007/0078950 A1 * | 4/2007 | Hopkins et al. | ............. | 709/217 |
| 2009/0185509 A1 * | 7/2009 | Lundstrom | ......... | H04L 41/0856 370/256 |

(Continued)

OTHER PUBLICATIONS

Nanda, Nitin et al, 'Create Your Own Type 3 JDBC Driver, Part 1,' dated May 17, 2002, reprinted from http://www.javaworld.com/javaworld/jw-05-2002/jw-0517-jdbcdriver.html on Aug. 17, 2010, 3 pages.

(Continued)

*Primary Examiner* — Ashish Thomas
*Assistant Examiner* — Mellissa M. Ohba
(74) *Attorney, Agent, or Firm* — Fish & Richardson P.C.

(57) ABSTRACT

A set of one or more database dependent API calls issued by an application are restructured at a database client system to generate a restructured set of database dependent API calls. The restructured set of database dependent API calls are translated at the database client system into one or more database independent API calls. Information representing the one or more database independent API calls is sent from the database client system to a hosted database system such that the hosted database system returns a response to the database independent API calls based on a database access.

14 Claims, 6 Drawing Sheets

(56) References Cited

U.S. PATENT DOCUMENTS

2009/0307230 A1* 12/2009 Fujiyama .......... G06F 17/30427
2017/0104742 A1* 4/2017 Chan ....................... H04L 63/08

OTHER PUBLICATIONS

JAVA Servlet Programming, Chapter 9. Database Connectivity, reprinted from http://docstore.mik.ua/orelly/java-ent/servlet/ch09_01.htm on Aug. 17, 2010, dated Oct. 1998, 4 pages.
'Database Management System,' Wikipedia, reprinted from http://en.wikipedia.org/wiki/Database_management_system on Aug. 17, 2010, 11 pages.
DataDirect Connect for ODBC, Release 5.0, DataDirect Technologies, May 2004, reprinted from http://www.endeavoursoftware.com/documents/dd/dd50/odbc5.pdf on Aug. 17, 2010, 6 pages.
'Java Database Connectivity,' Wikipedia, reprinted from http://en/wikipedia.org/wiki/Java_Database_Connectivity on Jan. 11, 2011, 8 pages.
'JDBC Driver,' Wikipedia, reprinted from http://en.wikipedia.org/wiki/JDBC_driver on Aug. 17, 2010, 6 pages.
'Open Database Connectivity,' Wikipedia, reprinted from http://en.wikipedia.org/wiki/Open_Database_Connectivity on Aug. 17, 2010, 5 pages.
'Oracle9i JDBC Developer's Guide and Reference: Release 2 (9.2),' Oracle Corporation, reprinted from http://download.oracle.com/docs/cd/B10500_01/java.920/a96654/overvw.htm on Aug. 17, 2010, 11 page.
'Progress DataDirect JDBC Drivers,' Progress Software Corporation, reprinted from http://web.datadirect.com/products/jdbc/index.htm on Aug. 17, 2010, 3 pages.
Java Servlet Programming: 9.2. The JDBC API, dated Oct. 1998, reprinted from http://docstore.mik.ua/orelly/java-ent/servlet/ch09_02.htm on Aug. 17, 2010, 11 pages.
'Using WebLogic Multitier JDBC Drivers,' BEA Systems, Inc., reprinted from http://download.oracle.com/docs/cd/E13222_01/wls/docs81b/jdbc/rmidriver.html on Aug. 17, 2010, 6 pages.
'What is a Wire Protocol ODBC Driver?,' Progress Software Corporation, reprinted from http://web.datadirect.com/products/odbc/odbcwireprot.html on Aug. 17, 2010, 2 pages.
'What is ODBC Driver Pack,' Synametrics Technologies, reprinted from http://www.synametrics.com/SynametricsWebApp/OdbcDrivers.jsp on Aug. 17, 2010, 1 page.
Wire Protocol ODBC Driver 'Drives' Instability Out of Subaru's Database Access, DataDirect Technologies, Copyright 2004, reprinted from http://www.datadirect.com/company/customers/docs/subaru.pdf, 2 pages.
'Wire Protocol ODBC Drivers and ODBC SDK,' Simba Technologies, Copyright 2008, reprinted from http://www.simab.com/docs/Wire-Protocol-ODBC-Drivers-and-ODBC-SDK.pdf, 3 pages.

* cited by examiner

US 10,324,952 B1

HOSTED DATABASE

TECHNICAL FIELD

This document relates to hosted databases.

BACKGROUND

Open Database Connectivity (ODBC) and Java Database Connectivity (JDBC) provide standardized set of application programming interfaces (APIs)) for accessing databases. The databases can include Oracle, DB2, Microsoft SQL Server, IBM Lotus Domino, MySQL, and PostgreSQL, to name a few examples. In general, the standard APIs are designed to be independent of the particular database or the associated database management system (DBMS). Applications can be designed to employ these database independent APIs, or applications can be designed to use database dependent calls, such as those in the MySQL wire protocol or the Oracle Call Interface.

SUMMARY

In one aspect, a set of one or more database dependent API calls issued by an application are restructured at a database client system to generate a restructured set of database dependent API calls. Restructuring the set of database dependent API calls includes combining two or more of the calls into a single call or removing one or more of the database dependent API calls from the set of database dependent API calls. The restructured set of database dependent API calls are translated at the dataset client system into one or more database independent API calls. Translating the restructured set of database dependent API calls results in at least one less database independent call than if the set of database dependent API calls issued by the application was translated into database independent API calls. Information representing the one or more database independent API calls is sent from the database client system to a hosted database system such that the hosted database system returns a response to the database independent API calls based on a database access, wherein the information is sent across a network from the database client system to the hosted database system.

Implementations may include one or more of the following features. For example, restructuring the set of database dependent API calls may include combining two or more of the calls into a single call. The two or more calls may be session management calls.

A first one of the two or more calls may correspond to a first database independent API call. A second one of the two or more calls may correspond to a second database independent API call, the first and second database independent API calls being different. The single call may correspond to a single database independent API call such that translating the restructured set of database dependent API calls into one or more database independent API calls includes translating the single call into a single database independent API call.

Restructuring the set of database dependent API calls may include removing one or more of the database dependent API calls from the set of database dependent API calls. The removed database dependent API call may be a session management call. The removed database dependent API call may set a session variable to a value and the session variable was previously set to the same value by an earlier session management call. The one or more database independent API calls may not include a database independent API call that corresponds to the removed database dependent API call.

The one or more database independent API calls may not include a database independent API call that corresponds to the removed database dependent API call. The server system may be located in a data center.

In another aspect, a set of one or more database dependent API calls issued by an application are restricted at a database client system to generate a restructured set of database dependent API calls, wherein restructuring the set of database dependent API calls includes combining two or more of the calls into a single call or removing one or more of the database dependent API calls from the set of database dependent API calls. Information representing the restructured set of database dependent API calls is sent from the database client system to a hosted database system such that the hosted database system returns a response to the restructured database dependent API calls based on a database access, wherein the information is sent across a network from the database client system to the hosted database system.

Implementations of any of the described techniques may include a method or process, an apparatus, a device, a machine, a system, or instructions stored on a computer-readable storage device. The details of one or more implementations are set forth in the accompanying drawings and the description below. Other features and advantages will be apparent from the description and drawings, and from the claims.

DETAILED DESCRIPTION

A hosted database client system may employ call batching or call eliding to reduce the number of calls that need to be sent to a hosted database over the network, which may help to improve performance in some cases. For example, an application running on a hosted database client system may be designed to issue database dependent API calls such as calls according to the MySQL wire protocol. The client system may batch or elide some of those calls before the calls are sent over a network, such as the Internet, to the hosted database system, which returns results to the hosted database client system. The batching or eliding may result in less calls being sent than if the original calls issued by the application were sent over the network. Performance may therefore be improved relative to the situation in which calls are not batched or elided because the batching or eliding can result in fewer calls and therefore fewer roundtrips to the hosted database. In some cases, after batching and/or eliding, the resulting calls may be translated from database dependent API calls into database independent API calls, such as JDBC or ODBC calls. The batching or eliding may result in less database independent API calls than if the original calls issued by the application were translated. In other cases, the resulting calls are maintained as database dependent API calls.

Figure 1:
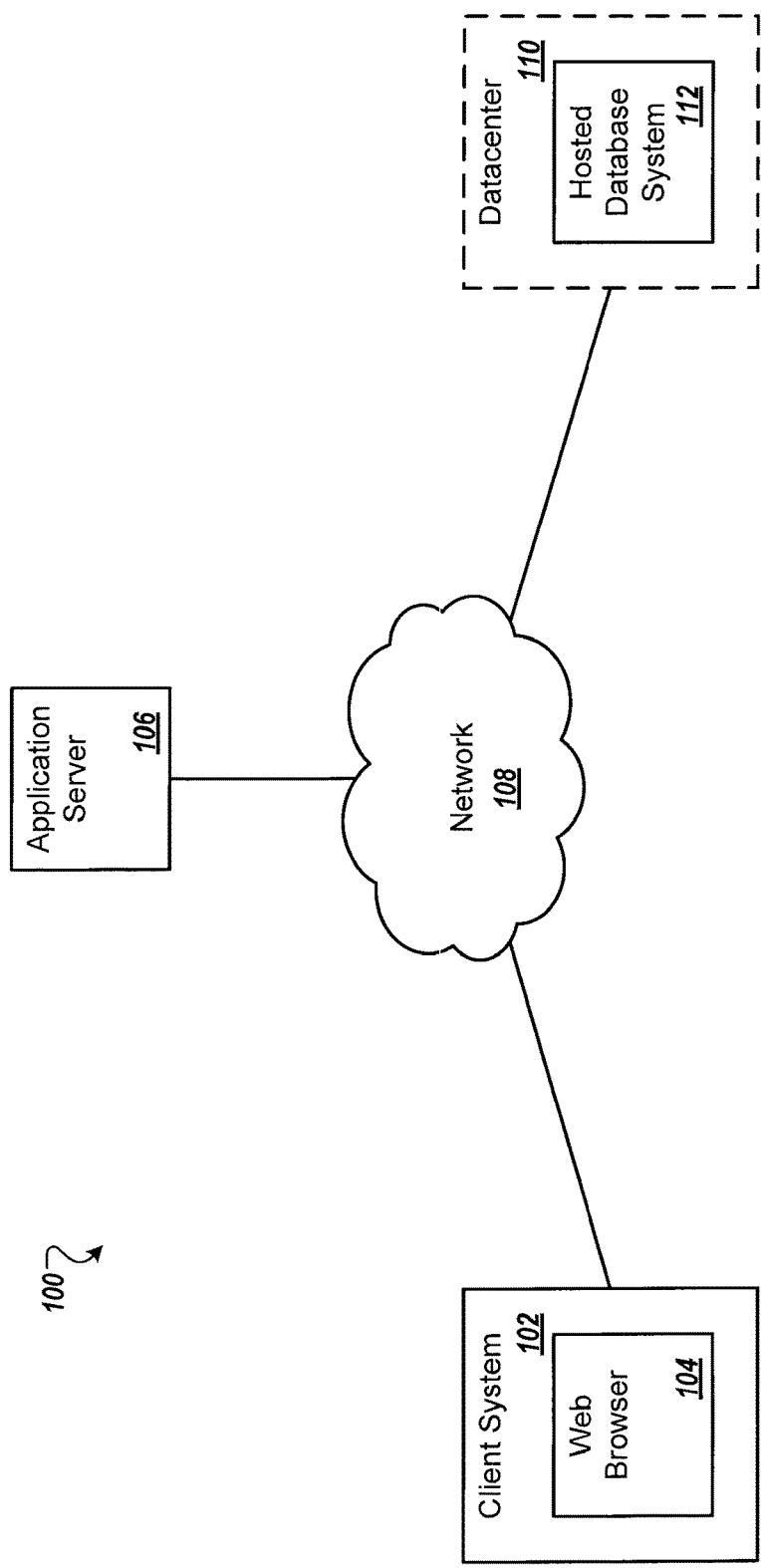
FIG. 1 is a block diagram illustrating an example of a system in which an application server employs a hosted database system to provide a web application to a web browser on a client system.

FIG. 1 is a block diagram illustrating an example of a system 100 in which an application server 106 employs a hosted database system 112 to provide a web application to a web browser 104 executing on a client system 102. In general, the client system 102 is an electronic device that is under control of a user and is capable of requesting and receiving resources over a network. Examples of client systems include personal computers, mobile communications devices, servers, and other devices that can send and receive data over a network.

The client system 102 executes a web browser 104 that presents web pages and other content to a user. The web browser 104 can request a web application (e.g., a cloud computing application) from an application server 106. For example, the web browser 104 can connect to the application server 106 using a network 108 and access a business application on the application server 106.

The application server 106 may access resources from a datacenter 110 in order to provide the business application to the web browser 104. For example, the application server 106 can query a hosted database system 112 located at the datacenter 110 for data needed by the business application. The hosted database system 112 can provide the requested resources to the application server 106 and the application server 106 can provide an instance of the business application to the web browser 104.

The network 108, such as a local area network (LAN), a wide area network (WAN), the Internet, or a combination thereof, connects the client system 102, the application server 106, and the datacenter 110. The system 100 may include many thousands of client systems, application servers, and datacenters. Different types and/or versions of application servers can connect to the same datacenter. Similarly, an application server can connect to different types and/or versions of hosted database systems. The different types and/or versions of hosted database systems can be located in the same datacenter or different datacenters.

The datacenter 110 includes one or more servers. For example, the hosted database system 112 can run on a single server. Alternatively, the hosted database system 112 can run on two or more servers, or thousands (or hundreds of thousands) of servers.

In some implementations, the application server 106 can reside in the datacenter 110 and communicate with the hosted database system 112 over the network of the datacenter 110. In other implementations, the application server 106 is geographically remote from the datacenter 110 and communicates with the hosted database system 112 over the Internet. The entity operating the hosted database system 112 may be different from the entity that designed and/or operates the application on the application server 106.

In some implementations, a local client application on the client system 102 other than the web browser 104 can access a web application on the application server 106. For example, the client system 102 can use a local client application provided by the application server 106 to access the web application.

Figure 2:
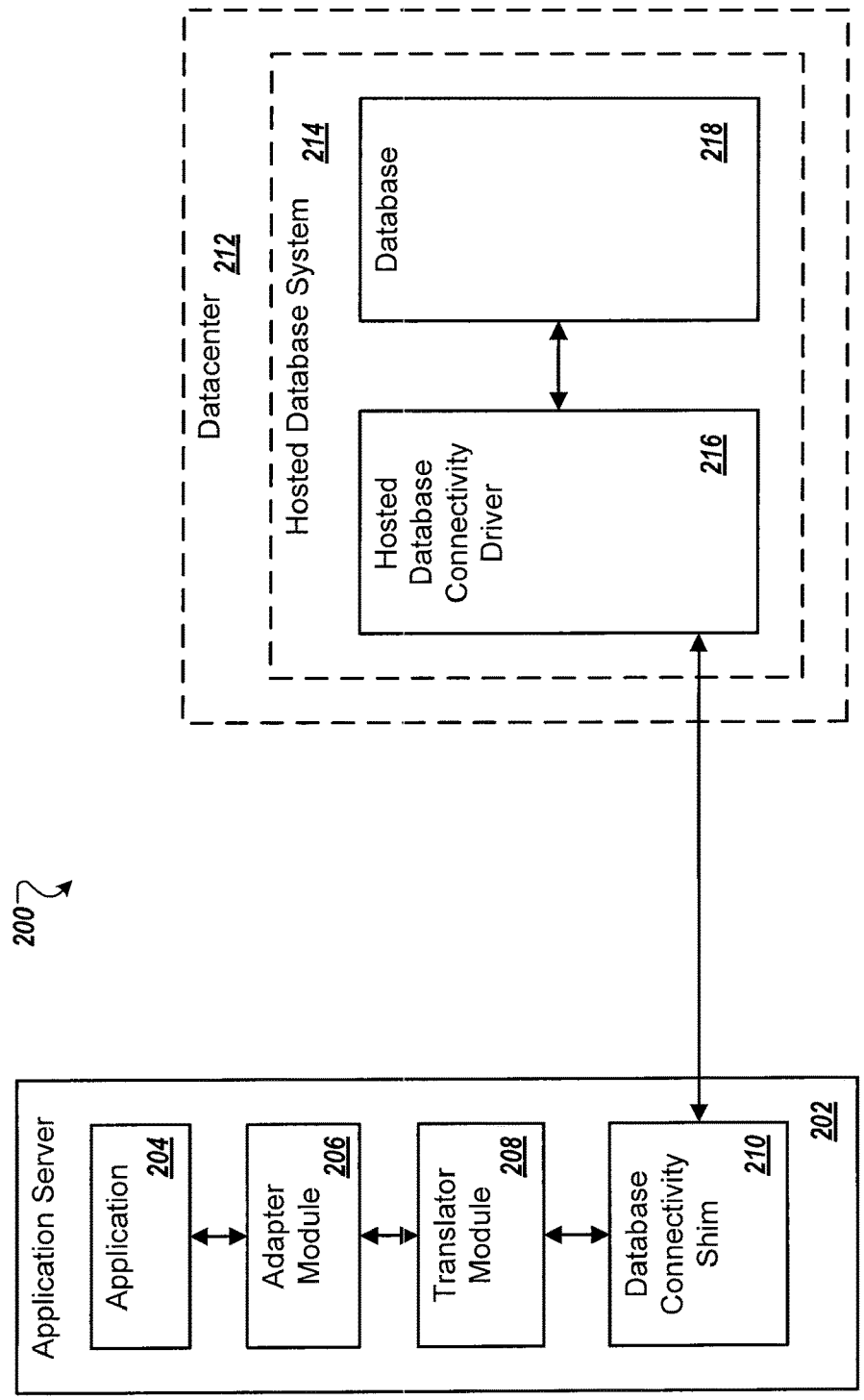
FIG. 2 is a block diagram illustrating an example of an implementation of an application server and a hosted database system.

FIG. 2 is a block diagram illustrating an example of a system 200 in which a hosted database system 214 is hosted in a datacenter 212 and provides database services to a database client system, such as an application server 202. The system 200 is designed so that database dependent API calls generated on the application server 202 are restructured in a way that reduces the number of calls made across a network from the application server 202 to the hosted database system 214.

Specifically, the application server 202 implements an application 204, an adapter module 206, a translator module 208, and a database connectivity shim 210. The application 204 can be a web application, such as a business application, a gaming application, or a social networking application, to name a few examples. In general, the application 204 may access a hosted database system available in datacenter 212 to retrieve various information.

When developing the application 204, the developer may use a set of database APIs that are database dependent. As a result, the database calls issued by the application 204 may be database dependent calls. As particular examples, the application 204 may be developed using APIs for the MySQL wire protocol or the Oracle Call Interface (OCI). For instance, the developer may develop the application 204 as if the application 204 was connecting to a MySQL or Oracle database running locally with the application 204 and, accordingly, use the corresponding database dependent APIs. This may be the case, for example, when the application was originally designed to connect to a locally running database, and the developer now wishes to connect the application 204 to the hosted database system 214. As another example, this may be the case when the developer is particularly familiar with the database dependent APIs and wants to developed using those APIs to reduce or minimize development time or costs. As yet another example, this may be the case when the application is written using a database dependent layer in a language or system without a database independent adapter to connected to the hosted database.

In either event, the developer may connect the application 204 to the adapter module 206 as if the adapter module 206 were a locally running database. As a result, the database dependent API calls issued by the application 204 are received by the adapter module 206. In some implementations, as described further below, the adapter module 206 restructures the received API calls and sends the restructured database dependent API calls to the translator module 208.

The translator module 208 translates the restructured or non-restructured database dependent API calls into database independent API calls. For example, the translator module 208 may translate the database dependent API calls into ODBC or JDBC API calls. The translator module 208 then issues the database independent API calls to the database connectivity shim 210.

The database connectivity shim 210, located on the application server 202, receives the database independent API calls from the translator module 208. The database connectivity shim 210 identifies a hosted database system 214 operating in a datacenter 212 associated with the application 204. For instance, the database independent API call or the application 204 can indicate a hosted database system 214 included in the datacenter 212 that is associated with the database independent API call. The database connectivity shim 210 sends information representing the database independent API call over a network, such as the Internet, to the hosted database system 214, e.g., using a wire protocol. For instance, the database connectivity shim 210 may convert the programmatic API call into a serialized form using, for instance, Google Protocol Buffers or eXtensible Markup Language (XML), and send the serialized form over a network (e.g., the Internet) to the hosted database system 214. The database connectivity shim 210 may communicate with the hosted database system 214 using, for example, a Representational State Transfer (REST) based API. In this case, the database connectivity shim 210 may send the serialized form of the programmatic API call to the hosted database system 214 over the REST-based API.

The hosted database system 214 includes a hosted database connectivity driver 216 and a database 218. The hosted database connectivity driver 216, such as an ODBC or JDBC driver, receives the information representing the database independent API call. The information is sent across a network (e.g., the network 108) from the database connectivity shim 210 to the hosted database connectivity driver 216.

The hosted database connectivity driver 216 converts the database independent API call into one or more database dependent API calls. For example, the hosted database connectivity driver 216 identifies a database 218 associated with the database independent API call and converts the database independent API call into one or more database dependent API calls based on the type and version of the database 218. As a particular example, if the database 218 is an Oracle® based database, the driver 216 converts the database independent API call into one or more Oracle Call Interface (OCI) calls. The type and version of the database 218 may be different than the type and version the application 204 was designed to work with. As an example, the application 204 may be designed to work with a MySQL database and therefore issue MySQL based calls, while the database 218 is implemented using an Oracle® based database. The type and/or version of the database 218 may be the same as the type and/or version the application 204 was designed to work with.

The hosted database connectivity driver 216 issues the one or more database dependent API calls to the database 218 such that the database returns result data to the hosted database connectivity driver 216 that satisfies the received database independent API call.

For each of the database dependent API calls, the database 218 provides the respective result data to the hosted database connectivity driver 216. The hosted database connectivity driver 216 receives the result data from the database 218 and sends the result data to the database connectivity shim 210 as database independent responses that satisfy the database independent API calls. The database connectivity shim 210 sends the results to the translator module 208. The translator module 208 translates the results into database dependent responses to the database dependent API calls sent from the application 204, and sends those database dependent responses to the application 204.

The application 204 can present the requested result data to the user (e.g., an employee list and associated employee information) or use the requested result data to identify properties associated with the content presented in the application 204 (e.g., if the data the user is viewing is marked "read only").

In some implementations, when the database 218 provides result data in response to the one or more database dependent API calls, the database connectivity driver 216 combines the result data to create combined result data and provides the combined result data to the database connectivity shim 210.

In some implementations, the database connectivity driver 216 identifies two or more databases located in the hosted database system 214 associated with the one or more database dependent API calls. For example, the database connectivity driver 216 can determine that the one or more database dependent API calls can be processed in parallel. The hosted database system 214 can include two or more databases with the same information, for use in parallel processing and backup of data. Alternatively, the hosted database system 214 can include two or more databases with different data, where one of the database dependent API calls is associated with one of the databases and another of the database dependent API calls is associated with another one of the databases. The first and the second databases can be of different types and/or versions or the same type and version.

The hosted database connectivity driver 216 and a database 218 can be implemented on a single computing device, or on separate computing devices. In addition, or alternatively, either the driver 216 or the database 218, or both, may be implemented by more than one computing device.

As noted above, in some implementations, the adapter module 206 is configured to restructure the database dependent API calls received by the adapter module 206 from the application 204, and send the restructured database dependent API calls to the translator module 208. For example, the adapter module 206 may be configured to batch or elide certain database dependent API calls. The adapter module 206, for instance, may be configured to batch or elide some or all session management calls, with the adapter module 206 responding to each of the individual session management calls from the application 204 as normal.

Database dependent APIs may be designed assuming the application and database are running locally with one another, with low/zero latency, and thus the protocols may be "chatty." For example, a typical MySQL interaction might look like:
Send: HANDSHAKE
Receive: AUTHENTICATE
Send: INIT
Receive: OK
Send: PING
Receive: OK
Send: QUERY set autocommit=1
Receive: OK
Send: QUERY set names utf8
Receive: OK
Send: QUERY select * from tablename;
Receive: RESULT SET
Send: QUERY set autocommit=1
Receive: OK
Send: QUERY set names utf8
Receive: OK
Send: QUERY select * from anothertablename;

When the database is not running locally (for instance, when the database is running in a datacenter located geographically remote from the application 204), there may be increased latency to communicate with the database, so the "chattiness" can result in poor performance. Batching and/or eliding certain database dependent API calls can, in some cases, preserve the semantics while reducing the number of roundtrips between the application server 202 and the hosted database system 214.

The example shown in FIG. 2 includes the translator module 208 to translate database dependent API calls into database independent API calls. However, in some cases, the hosted database system 214 may support the database dependent API calls, and the translator module 208 may not be needed. In such a scenario, the adapter module 206 may restructures the received database dependent API calls and send the restructured database dependent API calls directly to the database connectivity shim 210. The database connectivity shim 210 sends information representing the restructured database dependent API calls over a network. The hosted database connectivity driver 216 receives this information and, depending on the implementation, issues the received database dependent API calls directly to the database, or converts the database dependent API calls into one or more database dependent API calls that are appropriate for the database 218 and issues the converted calls to the database 218. The database 218 may then return the appropriate results, which may be forwarded to the database connectivity shim 210, which forwards the results to the adapter module 206, which in turns provides the results to the application 204.

Figure 3:
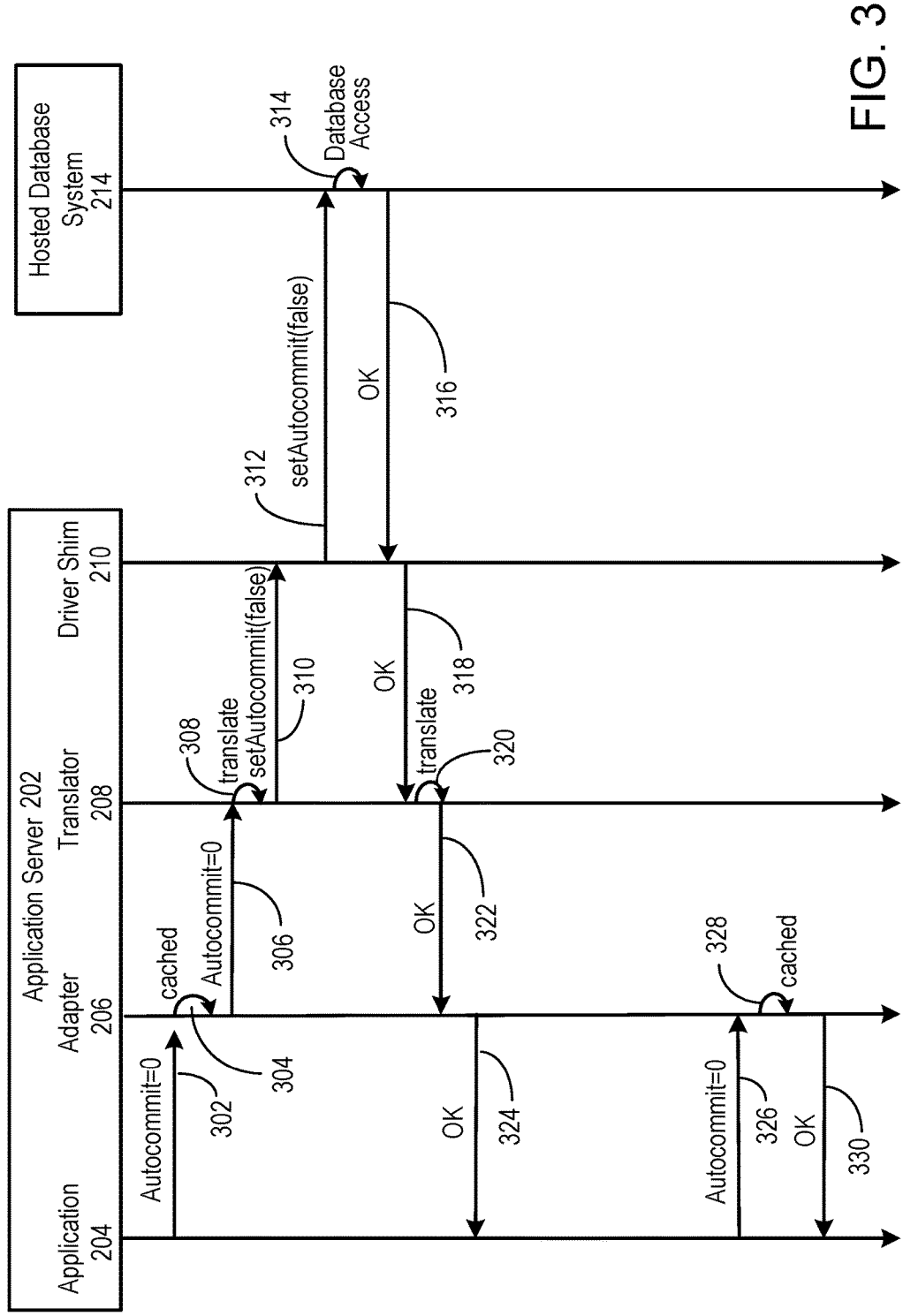
FIG. 3 is a swim lane diagram showing an example of call eliding.

FIG. 3 is a swim lane diagram 300 showing an example of call eliding for the MySQL wire protocol. In this particular example, the adapter module 206 translates calls like the following:

Send: QUERY set autocommit=0
Send: QUERY select * from tablename
Send: QUERY set autocommit=0
Send: QUERY select * from anothertablename
into:
Send: QUERY set autocommit=0
Send: QUERY select * from tablename
Send: QUERY select * from anothertablename As shown, the application 204 issues a MySQL autocommit command to set the autocommit state of the database (302). The autocommit command sets the autocommit state to 0. This autocommit command is received by the adapter module 206 and the adapter module determines whether the value of the autocommit state is cached or otherwise stored and, if so, whether the cached value matches the value in the received command (304). In this particular case, an autocommit command has not previously been received for this session, or the value in the current autocommit command is different from the cached value. As a result, the adapter 206 caches the received autocommit value and issues a MySQL autocommit command with a state of 0 to the translator (306).

The translator module 208 receives the MySQL autocommit command from the adapter and translates the received autocommit command into a database independent API call corresponding to the autocommit command (308). In the example shown, the translator module 208 translates the MySQL autocommit command (QUERY set autocommit=0) into a JDBC autocommit call (setAutocommit(false)). The translator module 208 sends the JDBC autocommit call to the driver shim 210 (310).

The driver shim 210 receives the JDBC autocommit call and sends information representing the JDBC autocommit call to the hosted database system 214 (312). For instance, the database connectivity shim 210 convert the programmatic API call into a serialized form using, for instance, Google Protocol Buffers or eXtensible Markup Language (XML), and send the serialized form over a network (e.g., the Internet) to the hosted database system 214.

At the hosted database system 214, a database is accessed according to the database independent API call (314). For example, the hosted database connectivity driver 216 may receive the information representing the JDBC autocommit call and generate one or more database dependent API calls to implement the autocommit command on the database 218. The database connectivity driver may issue those database dependent API calls to the database 218, and receive an OK response.

The hosted database system 214 sends the result of the database access to the driver shim 210 (316). For instance, the hosted database connectivity driver 216 may send information representing the OK response received from the database 218 to the driver shim 210. The driver shim 210 then forwards that response to the translator module (318) as a response to the JDBC autocommit command. The translator module 208 translates the response from a JDBC response to a MySQL response (320) and sends the MySQL response to the adapter module 206 (322), which sends the MySQL response to the application 204 (324).

After receiving the response, the application 204 may issue any number of MySQL commands (other than an autocommit command). At some later point, the application 204 issues a second autocommit command to the adapter 206 (326). The second autocommit command also sets the autocommit state to 0. This second autocommit command is received by the adapter module 206 and the adapter module determines whether the value of the autocommit state is cached or otherwise stored and, if so, whether the cached value matches the value in the received command (328). In this particular case, an autocommit command has previously been received for this session, and the value in the second autocommit command is the same as the value cached based on the earlier autocommit command. As a result, the adapter 206 returns an OK response to the application, but does not issue an autocommit command to the translator module 208 (330).

Thus, in this example, the second autocommit command is removed from the set of calls received by the adapter 206 because the second autocommit command sets the autocommit state to the same value as the first autocommit command. The adapter module 206 is configured to cache or otherwise store the current autocommit value and, when the adapter module 206 receives another autocommit command with the same value as the one stored, the adapter module 206 eliminates the additional autocommit command from the stream sent to the translator module 208. As a result, the translator module does not issue a database independent call to set the autocommit value, thereby eliminating the need for a round trip to the datacenter 212. Meanwhile, the adapter module 206 returns OK to the application 204 in response to the second autocommit command as normal.

There are other instances in which the autocommit command may be elided. For example, it is possible that the following sequence is issued from the application 204 in the event the application was developed under the expectation that it would run locally with the database:

Send: QUERY set autocommit=0
Send: QUERY set autocommit=0
Send: QUERY set autocommit=0
Send: QUERY select * from tablename Similar to the example above, the second and third autocommit commands may be elided.

Other session management variables can also be cached by the adapter module 206 and associated commands may be omitted from the stream sent to the translator module 208 when those commands attempt to set the variables to the values currently cached by the adapter module 206. For instance, the MySQL wire protocol session also includes language and transaction isolation variables that may be cached by the adapter module 206. Other examples also include "last inserted id" and "count of updated rows."

In addition, the adapter module 206 may retrieve and cache the default session management variables from the hosted database system 214 when a connection is initially made. The adapter module 206 may then update the session management variables at the hosted database system 214 when the application 204 issues a command to change them, and may cache the new values at that time (and maintain them cached until the application 204 changes them again).

Figure 4:
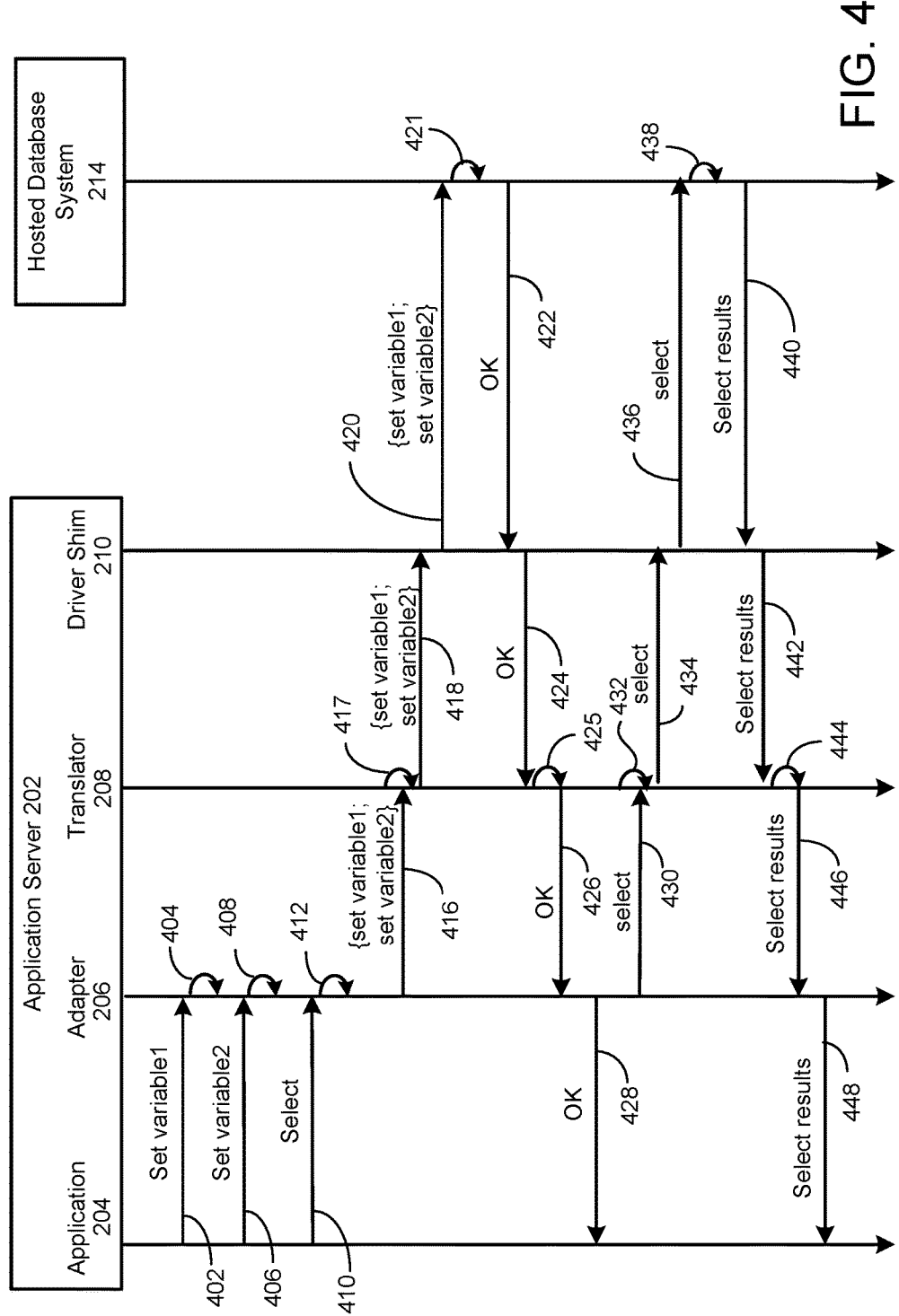
FIG. 4 is a swim lane diagram showing an example of call batching.

FIG. 4 is a swim lane diagram 400 showing an example of call batching for the MySQL wire protocol. In this particular example, the adapter module 206 translates calls like the following:
Send: QUERY set variable1=value1
Send: QUERY set variable2=value2
Send: QUERY select * from tablename
into:
Send: {QUERY set variable1=value1; QUERY set variable2=value2}
Send: QUERY select * from tablename As illustrated, the application 204 may issue set commands. There may be different kinds of set commands. For example, some may be local set commands, which affect only the current connection, and some may be global set commands which affect all other connections. In certain cases, local set commands are elided or batched when appropriate, but global set commands are not elided or batched because clients may expect they change system for all users of the database immediately.

As shown, the application 204 issues a MySQL set variable command to set the value of local variable 1 (402). This set command is received by the adapter module 206. The adapter module 206 determines that the command is a set command that sets a local variable and, as a result, stores the command and waits until certain criteria are met before issuing a command to the translator module 208 (404). For instance, in some implementations, the adapter module 206 is configured to hold commands until the application 204 issues a SET GLOBAL variable command (which may affect other sessions and therefore needs to be sent when issued by the application 204) or the application 204 issues a non-set, non-constant query (as opposed to a constant query such as "SELECT 1").

The application 204 issues another MySQL set variable command to set the value of local variable 2 (406). This set command is received by the adapter module 206. The adapter module 206 again determines that the command is a set command for a local variable and, as a result, stores the command and waits for the next command (408).

The application 204 then issues a select command to select everything from tablename (410). This select command is received by the adapter module 206. The adapter module 206 determines that the command is not a set command and is a non-constant query and, as a result, the adapter module 206 stores the select command and batches the two MySQL set commands into a single batch query command (412). The adapter module 206 sends the single set command to the translator module 208 (416).

The translator module 208 receives the single batch query command from the adapter module 206 and translates the received batch query command into a database independent API call (417). In the example shown, the translator module 208 translates the single MySQL set command ({QUERY set variable1=value1; QUERY set variable2=value2}) into a single JDBC set call. The translator module 208 sends the single JDBC set call to the driver shim 210 (418).

The driver shim 210 receives the JDBC set call and sends information representing the JDBC set call to the hosted database system 214 (420). For instance, the database connectivity shim 210 converts the programmatic API call into a serialized form using, for instance, Google Protocol Buffers or eXtensible Markup Language (XML), and sends the serialized form over a network (e.g., the Internet) to the hosted database system 214 using, for example, a REST API.

At the hosted database system 214, a database is accessed according to the database independent API call (421). For example, the hosted database connectivity driver 216 may receive the information representing the JDBC set call and generate one or more database dependent API calls to implement the set command on the database 218. The database connectivity driver may issue those database dependent API calls to the database 218, and receive an OK response.

The hosted database system 214 sends the result of the database access to the driver shim 210 (422). For instance, the hosted database connectivity driver 216 may send information representing the OK response received from the database 218 to the driver shim 210. The driver shim 210 then forwards that response to the translator module (424) as a response to the JDBC set command. The translator module 208 translates the response from a JDBC response to a MySQL response (425) and sends the MySQL response to the adapter module 206 (426), which sends the MySQL response to the application 204 (428).

After receiving the OK response, the adapter module 206 sends the select command to the translator module 208 (430). The translator module 208 receives the select command from the adapter module 206 and translates the received select command into a database independent API call corresponding to the select command (432). The translator module 208 sends the JDBC select call to the driver shim (434).

The driver shim 210 receives the JDBC select call and sends information representing the JDBC select call to the hosted database system 214 (436). For instance, the database connectivity shim 210 converts the programmatic API call into a serialized form using, for instance, Google Protocol Buffers or eXtensible Markup Language (XML), and send the serialized form over a network (e.g., the Internet) to the hosted database system 214.

At the hosted database system 214, a database is accessed according to the database independent API call (438). For example, the hosted database connectivity driver 216 may receive the information representing the JDBC select call and generate one or more database dependent API calls to implement the select command on the database 218. The database connectivity driver may issue those database dependent API calls to the database 218, and receive a response that includes the results of the select operation.

The hosted database system 214 sends the result of the database access to the driver shim 210 (440). For instance, the hosted database connectivity driver 216 may send information representing the response received from the database 218 to the driver shim 210. The driver shim 210 then forwards that response to the translator module (442) as a response to the JDBC select command. The translator module 208 translates the response from a JDBC response to a MySQL response (444) and sends the MySQL response to the adapter module 206 (446), which sends the MySQL response to the application 204 (448).

In this example, the single set command is sent separately from the select command. This may be done, for example, when the database independent API limits the ability to batch the set commands with the select command. For instance, JDBC doesn't allow the results of the set commands to be returned to the adapter module 206 and therefore application 204 when the set commands are batched with the select command. As a result, the application 204 can not verify these commands were properly executed. Therefore, it is beneficial to separate the set commands from the select commands. However, in appropriate situations using JDBC or another API, the set and select commands can be batched together.

In this example, the two, individual session management calls to set the variable1 and variable2 are combined into a single session management call by the adapter module 206. The adapter module 206 responds to each of the individual session management calls from the application 204 with an OK as normal. But, as a result of batching the two session management calls, the adapter module 206 sends only one call to the translator module 208, which, as a result, issues one database independent API call rather than two to set the variables. Because only one call is used, only a single round trip to and from the datacenter 212 is needed to set the variables, as opposed to the two that would have been needed if no batching occurred. In some cases, eliminating the additional round trip can increase performance by eliminating the need to wait for a response to the additional call.

Figure 5:
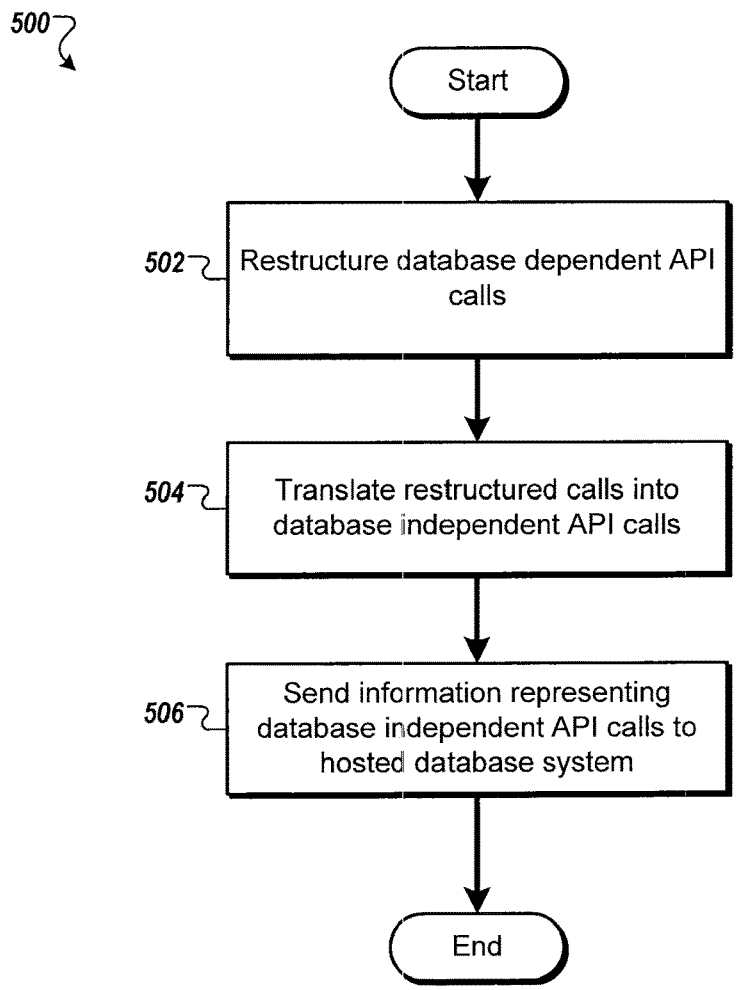
FIG. 5 is a flow chart showing an example of a process for accessing a hosted database system.

FIG. 5 is a flow chart showing an example of a process 500 for accessing a hosted database system. The process 500 can, for example, be performed by a database client system such as the application server 202. However, another system or combination of systems can be used to perform the process 500.

A set of one or more database dependent API calls issued by an application are restructured at the database client system to generate a restructured set of database dependent API calls (502). For example, the application may issue a set of one or more database dependent API calls, such as MySQL wire protocol call, to the adapter module 206 and the adapter module 206 may restructure the set of calls. Restructuring the set of database dependent API calls includes combining two or more of the calls into a single call or removing one or more of the database dependent API calls from the set of database dependent API calls. For instance, as described above, the adapter module 206 may remove a call that attempts to set a session or other variable to a value that the variable was previously set to by an earlier session management or other call. As another example, the adapter module 206 may combine two calls that set the values of two variables into a single call that sets the two values.

The restructured set of database dependent API calls are translated into one or more database independent API calls at the database client system (504). For example, the adapter module 206 may issue the restructured database dependent API calls to the translator module 208, and the translator module 208 may translate the received calls into database independent calls such as JDBC or ODBC calls. Translating the restructured set of database dependent API calls results in at least one less database independent call than if the set of database dependent API calls issued by the application was translated into database independent API calls.

For example, when two or more calls are combined into a single call, a first one of the two or more calls may correspond to a first database independent API call, a second one of the two or more calls corresponds to a second, different database independent API call, and the resulting the single call corresponds to a single database independent API call such that translating the restructured set of database dependent API calls into one or more database independent API calls includes translating the single call into a single database independent API call. As another example, when a database dependent API call is removed, the resulting database independent API calls may not include a database independent API call that corresponds to the removed database dependent API call because it was removed.

Information representing the one or more database independent API calls is sent from the database client system to a hosted database system such that the hosted database system returns a response to the database independent API calls based on a database access (506). For example, the translator module 208 may send the database independent calls to the driver shim 210, which serializes the calls and sends the serialized calls to the hosted database connectivity driver 216. The hosted database connectivity driver 216 may receive the information, generate one or more database dependent API calls from the received information, and issue the calls to the database 218, which sends back one or more responses. The hosted database connectivity driver 216 may then generate one or more responses to the database independent API calls based on the responses from the database, and send the generated response back to the database connectivity shim 210, which passes the response to the translator module 208, which translates the response into a database dependent response and sends that response to the adapter module 206, which sends an appropriate response to the application 204 if needed.

In implementations that do not employ translation, the operation 504 may be eliminated. In such a scenario, information representing the restructured database dependent API calls is sent from the database client system to a hosted database system such that the hosted database system returns a response to the database dependent API calls based on a database access. For example, the adapter module 206 may send the restructured database dependent calls to the driver shim 210, which serializes the calls and sends the serialized calls to the hosted database connectivity driver 216. The hosted database connectivity driver 216 may receive the information, and issue one or more database dependent API calls to the database 218 based on the received information. The hosted database connectivity driver 216 may then generate one or more responses to the restructured database dependent API calls based on the responses from the database, and send the generated response back to the database connectivity shim 210, which passes the response to the adapter module 206, which sends an appropriate response to the application 204 if needed.

Figure 6:
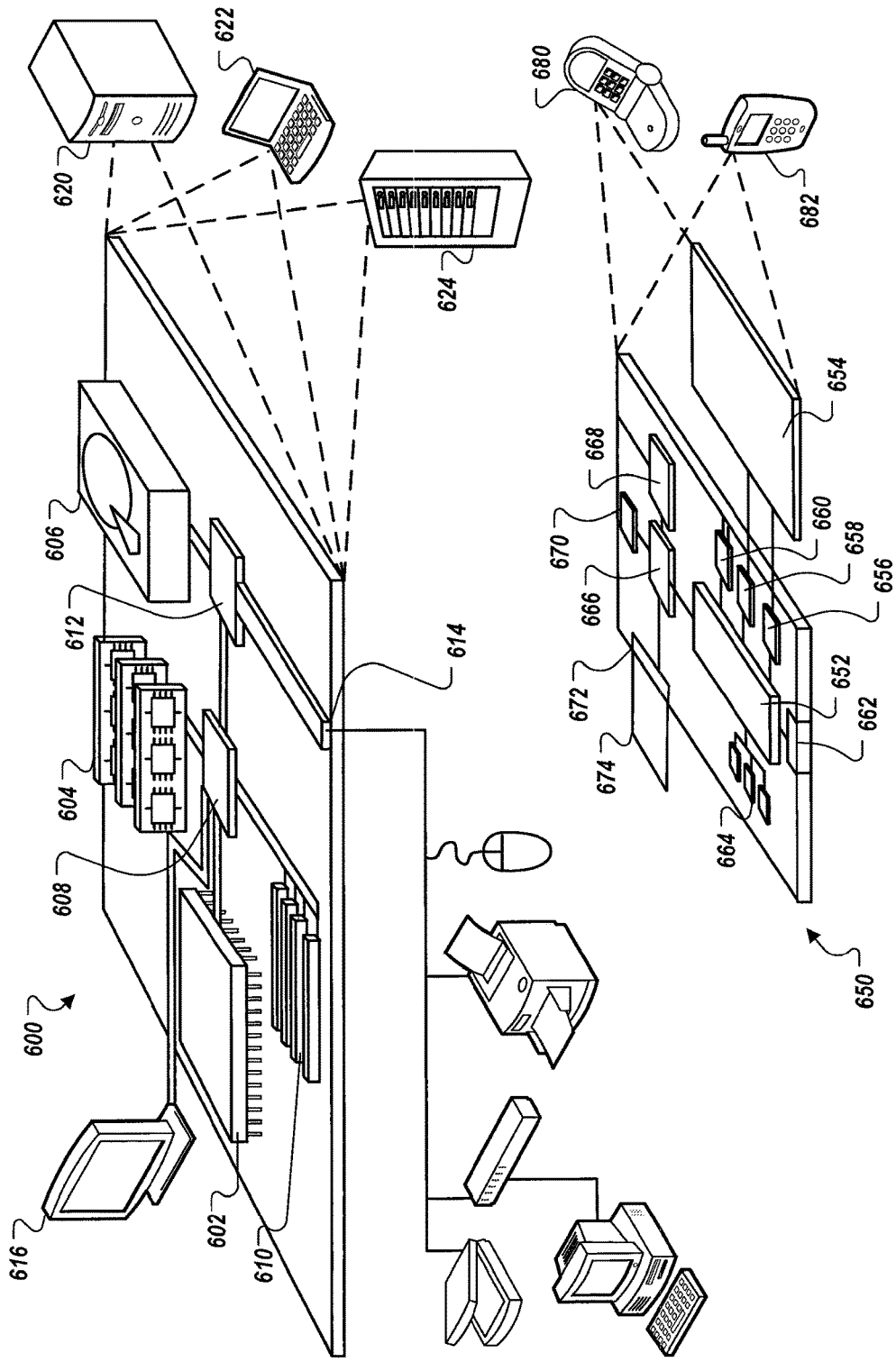
FIG. 6 shows an example of a computing device and a mobile computing device.

FIG. 6 shows an example of a computing device 600 and a mobile computing device 650 that can be used to implement the techniques described here. The computing device 600 is intended to represent various forms of digital computers, such as laptops, desktops, workstations, personal digital assistants, servers, blade servers, mainframes, and other appropriate computers. The mobile computing device 650 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 600 includes a processor 602, a memory 604, a storage device 606, a high-speed interface 608 connecting to the memory 604 and multiple high-speed expansion ports 610, and a low-speed interface 612 connecting to a low-speed expansion port 614 and the storage device 606. Each of the processor 602, the memory 604, the storage device 606, the high-speed interface 608, the high-speed expansion ports 610, and the low-speed interface 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as a display 616 coupled to the high-speed interface 608. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 604 stores information within the computing device 600. In some implementations, the memory 604 is a volatile memory unit or units. In some implementations, the memory 604 is a non-volatile memory unit or units. The memory 604 may also be another form of computer-readable medium, such as a magnetic or optical disk.

The storage device 606 is capable of providing mass storage for the computing device 600. In some implementations, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 602), perform one or more methods, such as those described above. The instructions can also be stored by one or more storage devices such as computer- or machine-readable mediums (for example, the memory 604, the storage device 606, or memory on the processor 602).

The high-speed interface 608 manages bandwidth-intensive operations for the computing device 600, while the low-speed interface 612 manages lower bandwidth-intensive operations. Such allocation of functions is an example only. In some implementations, the high-speed interface 608 is coupled to the memory 604, the display 616 (e.g., through a graphics processor or accelerator), and to the high-speed expansion ports 610, which may accept various expansion cards (not shown). In the implementation, the low-speed interface 612 is coupled to the storage device 606 and the low-speed expansion port 614. The low-speed expansion port 614, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. In addition, it may be implemented in a personal computer such as a laptop computer 622. It may also be implemented as part of a rack server system 624. Alternatively, components from the computing device 600 may be combined with other components in a mobile device (not shown), such as a mobile computing device 650. Each of such devices may contain one or more of the computing device 600 and the mobile computing device 650, and an entire system may be made up of multiple computing devices communicating with each other.

The mobile computing device 650 includes a processor 652, a memory 664, an input/output device such as a display 654, a communication interface 666, and a transceiver 668, among other components. The mobile computing device 650 may also be provided with a storage device, such as a micro-drive or other device, to provide additional storage. Each of the processor 652, the memory 664, the display 654, the communication interface 666, and the transceiver 668, are interconnected using various buses, and several of the components may be mounted on a common motherboard or in other manners as appropriate.

The processor 652 can execute instructions within the mobile computing device 650, including instructions stored in the memory 664. The processor 652 may be implemented as a chipset of chips that include separate and multiple analog and digital processors. The processor 652 may provide, for example, for coordination of the other components of the mobile computing device 650, such as control of user interfaces, applications run by the mobile computing device 650, and wireless communication by the mobile computing device 650.

The processor 652 may communicate with a user through a control interface 658 and a display interface 656 coupled to the display 654. The display 654 may be, for example, a TFT (Thin-Film-Transistor Liquid Crystal Display) display or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may provide communication with the processor 652, so as to enable near area communication of the mobile computing device 650 with other devices. The external interface 662 may provide, for example, for wired communication in some implementations, or for wireless communication in other implementations, and multiple interfaces may also be used.

The memory 664 stores information within the mobile computing device 650. The memory 664 can be implemented as one or more of a computer-readable medium or media, a volatile memory unit or units, or a non-volatile memory unit or units. An expansion memory 674 may also be provided and connected to the mobile computing device 650 through an expansion interface 672, which may include, for example, a SIMM (Single In Line Memory Module) card interface. The expansion memory 674 may provide extra storage space for the mobile computing device 650, or may also store applications or other information for the mobile computing device 650. Specifically, the expansion memory 674 may include instructions to carry out or supplement the processes described above, and may include secure information also. Thus, for example, the expansion memory 674 may be provide as a security module for the mobile computing device 650, and may be programmed with instructions that permit secure use of the mobile computing device 650. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 652), perform one or more methods, such as those described above. The instructions can also be stored by one or more storage devices, such as one or more computer- or machine-readable mediums (for example, the memory 664, the expansion memory 674, or memory on the processor 652). In some implementations, the instructions can be received in a propagated signal, for example, over the transceiver 668 or the external interface 662.

The mobile computing device 650 may communicate wirelessly through the communication interface 666, which may include digital signal processing circuitry where necessary. The communication interface 666 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 668 using a radio-frequency. In addition, short-range communication may occur, such as using a Bluetooth, WiFi, or other such transceiver (not shown). In addition, a GPS (Global Positioning System) receiver module 670 may provide additional navigation- and location-related wireless data to the mobile computing device 650, which may be used as appropriate by applications running on the mobile computing device 650.

The mobile computing device 650 may also communicate audibly using an audio codec 660, which may receive spoken information from a user and convert it to usable digital information. The audio codec 660 may likewise generate audible sound for a user, such as through a speaker, e.g., in a handset of the mobile computing device 650. Such sound may include sound from voice telephone calls, may include recorded sound (e.g., voice messages, music files, etc.) and may also include sound generated by applications operating on the mobile computing device 650.

The mobile computing device 650 may be implemented in a number of different forms, as shown in the figure. For example, it may be implemented as a cellular telephone 680. It may also be implemented as part of a smart-phone 682, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures do not require the particular order shown, or sequential order, to achieve desirable results. In addition, other actions may be provided, or actions may be eliminated, from the described flows, and other components may be added to, or removed from, the described systems. Other implementations are within the scope of the following claims.

What is claimed is:

1. A method comprising:
    obtaining, by an adapter at a database client system, a set of one or more database dependent API calls issued by an application;
    determining, by the adapter at the database client system, that the set of one or more database dependent API calls issued by the application includes a database dependent API call that sets a session variable to a same value that the session variable is currently set;
    in response to determining that the set of one or more database dependent API calls issued by the application includes the database dependent API call that sets the session variable to the same value that the session variable is currently set, generating, by the adapter at the database client system, a restructured set of database dependent API calls by removing the database dependent API call that sets the session variable to the same value that the session variable is currently set from the set of database dependent API calls;
    translating, by a translator at the database client system and before sending information representing translated database independent API calls from the database client system to a hosted database system, the restructured set of database dependent API calls into one or more database independent API calls, wherein translating the restructured set of database dependent API calls into one or more database independent API calls results in at least one less database independent API call than if the set of database dependent API calls issued by the application was translated into database independent API calls; and sending, from the database client system to the hosted database system, information representing the one or more translated database independent API calls that was translated from being database dependent API calls into database independent API calls, such that the hosted database system is caused to return a response to the one or more translated database independent API calls based on at least one database access, wherein the information representing the one or more translated database independent API calls is sent across a network from the database client system to the hosted database system.

2. The method of claim 1 wherein restructuring the set of database dependent API calls includes combining two or more of the calls into a single call.

3. The method of claim 1 wherein the two or more calls are session management calls.

4. The method of claim 1 wherein:
a first one of the two or more calls corresponds to a first database independent API call;
a second one of the two or more calls corresponds to a second database independent API call, the first and second database independent API calls being different; and
the single call corresponds to a single database independent API call such that translating the restructured set of database dependent API calls into one or more database independent API calls includes translating the single call into a single database independent API call.

5. The method of claim 1, wherein the one or more database independent API calls does not include a database independent API call that corresponds to the removed database dependent API call.

6. The method of claim 1, wherein the database dependent API calls are included in a first API associated with a particular database type, and wherein the database independent API calls are included in a second API different than the first API and supported by a plurality of database types.

7. The method of claim 1, wherein determining, by the adapter at the database client system, that the set of one or more database dependent API calls issued by the application includes a database dependent API call that sets a session variable to a same value that the session variable is currently set comprises:
determining, by the adapter, that a value cached by the adapter for the session variable indicates that the session variable was previously set to the same value.

8. The method of claim 1, wherein the set of one or more database dependent API calls issued by the application also includes a second different database dependent API call, and
the method comprises providing an acknowledgement to the application that the database dependent API call that sets the session variable to the same value that the session variable is currently set was received without providing the database dependent API call to the translator.

9. A non-transitory computer readable medium storing instructions executable by one or more processing devices which, upon such execution, cause the one or more processing devices to perform operations comprising:
obtaining, by an adapter at a database client system, a set of one or more database dependent API calls issued by an application;
determining, by the adapter at the database client system, that the set of one or more database dependent API calls issued by the application includes a database dependent API call that sets a session variable to a same value that the session variable is currently set;
in response to determining that the set of one or more database dependent API calls issued by the application includes the database dependent API call that sets the session variable to the same value that the session variable is currently set, generating, by the adapter at the database client system, a restructured set of database dependent API calls by removing the database dependent API call that sets the session variable to the same value that the session variable is currently set from the set of database dependent API calls;
translating, by a translator at the database client system and before sending information representing translated database independent API calls from the database client system to a hosted database system, the restructured set of database dependent API calls into one or more database independent API calls, wherein translating the restructured set of database dependent API calls into one or more database independent API calls results in at least one less database independent API call than if the set of database dependent API calls issued by the application was translated into database independent API calls; and
sending, from the database client system to the hosted database system, information representing the one or more translated database independent API calls that was translated from being database dependent API calls into database independent API calls, such that the hosted database system is caused to return a response to the one or more translated database independent API calls based on at least one database access, wherein the information representing the one or more translated database independent API calls is sent across a network from the database client system to the hosted database system.

10. The medium of claim 9 wherein restructuring the set of database dependent API calls includes combining two or more of the calls into a single call.

11. The medium of claim 9 wherein the two or more calls are session management calls.

12. The medium of claim 9 wherein:
a first one of the two or more calls corresponds to a first database independent API call;
a second one of the two or more calls corresponds to a second database independent API call, the first and second database independent API calls being different; and
the single call corresponds to a single database independent API call such that translating the restructured set of database dependent API calls into one or more database independent API calls includes translating the single call into a single database independent API call.

13. The medium of claim 9, wherein the one or more database independent API calls does not include a database independent API call that corresponds to the removed database dependent API call.

14. A system comprising:
a database client system comprising one or more processing devices and one or more non-transitory computer readable medium storing instructions that, when executed by the one or more processing devices, cause the one or more processing devices to perform operations comprising:
- restructuring, by an adapter, a set of one or more database dependent API calls issued by an application;
- determining, by the adapter, that the set of one or more database dependent API calls issued by the application includes a database dependent API call that sets a session variable to a same value that the session variable is currently set;
- in response to determining that the set of one or more database dependent API calls issued by the application includes the database dependent API call that sets the session variable to the same value that the session variable is currently set, generating, by the adapter, a restructured set of database dependent API calls by removing the database dependent API call that sets the session variable to the same value that the session variable is currently set from the set of database dependent API calls;
- translating, by a translator, the restructured set of database dependent API calls into one or more database independent API calls, wherein translating the restructured set of database dependent API calls into one or more database independent API calls results in at least one less database independent call than if the set of database dependent API calls issued by the application was translated into database independent API calls, and wherein the translating occurs before information representing translated database independent API calls is sent from the database client system to a hosted database system; and
- sending, to the hosted database system, information representing the one or more translated database independent API calls that was translated from being database dependent API calls into database independent API calls, wherein the information representing the one or more translated database independent API calls is sent across a network from the database client system to the hosted database system; and the hosted database system configured to:
- receive the information representing the one or more translated database independent API calls;
- generate one or more responses to the one or more database independent API calls based on at least one database access; and
- send the one or more responses to the database client system.

* * * * *